(12) United States Patent
Zdornov et al.

(10) Patent No.: US 12,147,323 B2
(45) Date of Patent: Nov. 19, 2024

(54) FILE SYSTEMS CAPACITY ESTIMATION

(71) Applicant: VAST DATA LTD., Tel Aviv (IL)

(72) Inventors: Vlad Zdornov, Tel Aviv (IL); Avi Goren, Tel Aviv (IL); Ohad Shamir, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 89 days.

(21) Appl. No.: 17/657,343

(22) Filed: Mar. 30, 2022

(65) Prior Publication Data

US 2023/0315606 A1 Oct. 5, 2023

(51) Int. Cl.
*G06F 11/34* (2006.01)
*G06F 11/30* (2006.01)
*G06F 16/11* (2019.01)
*G06F 16/174* (2019.01)

(52) U.S. Cl.
CPC ...... *G06F 11/3442* (2013.01); *G06F 11/3037* (2013.01); *G06F 16/125* (2019.01); *G06F 16/1744* (2019.01)

(58) Field of Classification Search
CPC ............... G06F 16/125; G06F 16/1744; G06F 16/1748; G06F 11/3442; G06F 11/3037
See application file for complete search history.

(56) References Cited

U.S. PATENT DOCUMENTS

| | | | |
|---|---|---|---|
| 9,244,976 B1 * | 1/2016 | Zhang | G06F 16/2453 |
| 9,286,313 B1 * | 3/2016 | Sharangpani | G06F 16/2372 |
| 2022/0398220 A1 * | 12/2022 | Khachane | G06F 16/1748 |

* cited by examiner

*Primary Examiner* — David R Lazaro
*Assistant Examiner* — Xiang Yu
(74) *Attorney, Agent, or Firm* — Reches Patents

(57) ABSTRACT

A method for determining size information related one or more file systems stored in a storage system, the method may include (i) sampling one or more logical spaces that are associated with the one or more file systems to provide sampled file system entities (FSEs); wherein a number of samples per sampled FSE is indicative of a size of the sampled FSEs; and (ii) determining logical sizes and physical sizes of different levels of the one or more file systems based on the sampled file system entities.

29 Claims, 4 Drawing Sheets

Sampling one or more logical spaces that are associated with the one or more file systems to provide sampled file system entities (FSEs); wherein a number of samples per sampled FSE is indicative of a size of the sampled FSEs 110

Determining logical sizes and physical sizes of different levels of the one or more file systems based on the sampled file system entities. 120

Calculating logical sizes of the sampled FSEs and calculating physical sizes of the sampled FSEs. 122

Calculating logical sizes of the sampled FSEs and calculating physical sizes of the sampled FSEs. 130

FILE SYSTEMS CAPACITY ESTIMATION

TECHNICAL FIELD

The present disclosure generally relates to the field of data storage, and more particularly to file system capacity estimation.

BACKGROUND

File systems are getting bigger and bigger and may include more than billions of files, billions of directories, huge directories that includes multitude files, and multi-petabytes of storage.

The storage system administrator may need to know the storage space allocated to various hierarchies of the filesystem, e.g., directories, sub-directories, as well as the storage space allocated to snapshots.

In order to provide information about the storage space occupied by the multitude hierarchies of the filesystem, vast recursive traverse of the hierarchy paths for aggregation of space counters along hierarchy paths are required. These traversing for calculating dynamically changing capacities of directories needs to be executed constantly in order to obtain current calculations of logical capacity and physical capacity of different hierarchies, as well as logical capacity and physical capacity of directory snapshots of the different hierarchies.

SUMMARY

There may be provided a storage system, a method and a non-transitory computer readable medium for file system capacity estimation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1 is an example of a method.

DETAILED DESCRIPTION

Figure 2:
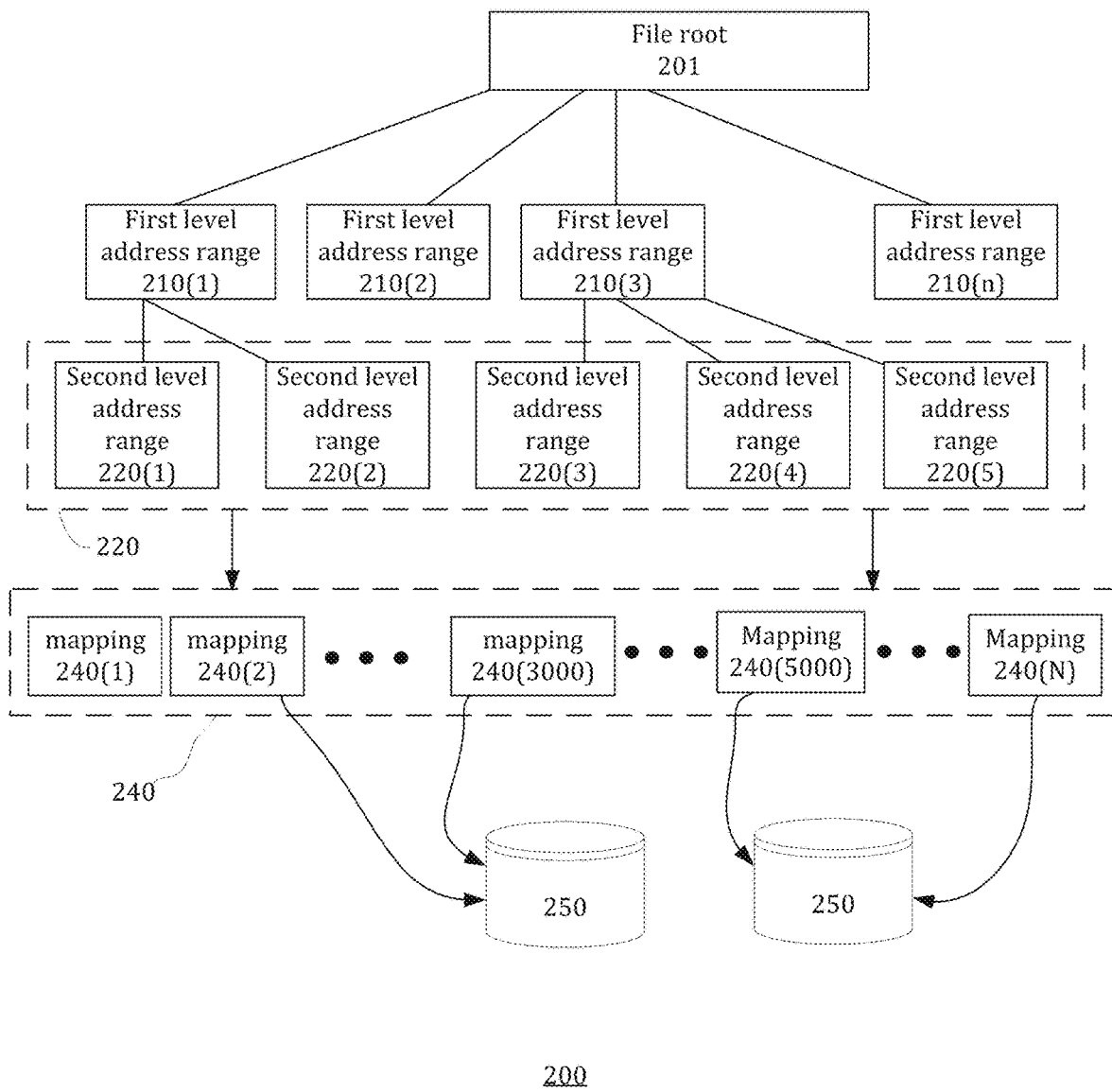
FIG. 2 is an example of data structures.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a non-transitory computer readable medium and a method that may provide estimation of the logical and physical capacity (size) of each hierarchy within a hierarchical structure for storing data, such as a filesystem, based on a sampling of the logical address space of the filesystem. The logical address space refers to an uneven structured address space, and particularly, to a space occupied by a filesystem that includes logical entities, structured as a tree, such as files, directories, sub trees, and snapshots of sub-trees. The capacity estimation may be provided to any hierarchy or sub-hierarchy within the tree of the filesystem, for example, a directory along with the entire sub-tree descended from the directory.

The sampling is done in a manner that may guarantee (or at least attempt) that the number of samples per sampled FSE is indicative of a size of the sampled FSEs. For example—random or uniform sampling may be applied, where a large number of samples are performed. The number of samples during each period of sampling may be depended on the total size of filesystems being sampled and the desired statistical error. For example, for a 1-Peta byte storage system and an error of less than 1 GB, several tens of millions of samples are performed.

The logical space is the space captured from the user point of view, i.e., size of data written to files by the user, or space captured by the user when taking snapshots, regardless any data reduction being used. The physical space is the actual space being occupied in the storage devices when taking into account the data reduction and overheads.

The sampling selects a logical offset within the logical address space and then translates the logical offset to the mapped physical offset. Physical blocks may not store back pointers to the logical entities (e.g., files) to whom the content of the physical blocks belong, so it is not always feasible to determine the file associated with the physical block. Therefore, the process may start with a logical sampling.

The sampling of the logical address space includes selecting a random logical offset that stores data of at least one logical entity. The logical entity (e.g., file) can be determined once the logical offset has been selected. By selecting a random logical offset, instead of selecting a file or directory, large files and directories are sampled more times than small files and directories. Consider a file of 1 Giga bytes versus a file of 1 Megabytes, and given a sampling that includes multitude samples, the 1 GB file is likely to be sampled 1000 times more than the 1 MB file.

The selecting may further include a version identifier or a timestamp, which may be either a specific snapshot or the current working version.

The sizes of the samples are attributed to the sampled file, and then—to a parent directory that hosts the sampled file and to any ancestor directory above the parent directory, up to the root directory.

The size of the logical sample may be considered as one byte (or any other basic unit) and added to the logical size counter of the file to whom the logical sample belongs.

The physical sample is a stored content that is mapped by the logical sample and is influenced by various data reduction mechanisms applied to the content.

The physical sample is determined by using a mapping data structure that maps the offsets of each file into physical locations. The logical offset is a key used for looking up the mapping data structure, so as to obtain a physical block where the content of the logical offset is stored.

The physical blocks within the storage devices may be of different sizes due to, at least, data reduction mechanism applied on data and resulting various compression ratios. The data reduction may include compression, deduplication and similarity mechanism.

The reduction rate of the physical block associated with the sample is determined. For example, if the original block size is 32 KB, and the compression mechanism reduced the block to 16 KB, then the reduction rate is 200% (uncompressed size divided by the compressed size). Meaning that the sampled byte is reduced in the physical plane into 0.5 byte (half of the sampled logical size). As for another example, if the physical block is deduplicated and shared by e.g., 5 other blocks, then the reduction rate is 500%, i.e., each of the five blocks sharing the content are attributed with only 20% of the original content. Meaning that the sampled byte is reduced in the physical plane into 0.2 byte.

The calculation is more complicated when similarity reduction is involved. The physical block associated with the sample may be similar to another block stored in the storage system. Storing a block that is identified as similar to another block (the other block is a reference block) may involve storing only a delta that is included only in the block and not included in the reference block, and a pointer to the reference block. The reference block is associated with a similar reference counter indicating the number of similar blocks referring to the reference block and sharing its content. In a case where the sampled byte is part of a block that points to a reference block, the estimated physical space occupied by this block is calculated as the sum of the block size plus the reference block size divided by the similar reference counter (the number of similar referring blocks).

The block of the sampled offset may be further pointed by multiple logical entities, e.g., files physical links. In this case the block size is divided into the number of referring logical entities. Therefore, the estimated physical space occupied by a block that refers to a similar reference block and is being referred by logical entities—is calculated as:

<sample block size>/<number of logical referring entities>+<similar reference block size>/<number of similar referring blocks>

The size of the physical sample is the size of 1 byte accounted to the logical sample divided by the data reduction ratio.

The sizes of the logical sample and the physical sample are accumulated for the respective sampled logical entity (e.g., file).

The metadata of each file and each directory may include counters for logical sampled size and physical sampled size that accumulate sizes of physical samples and logical samples that belong to the files and directories. In addition, samples that belong to a snapshot (as opposed to the working version), are accumulated by the logical and physical sizes in the relevant snapshot counters.

The sampling is performed during sampling periods of either a certain time window, e.g., 10 minutes, or the period may be ended when a certain number of samples have been collected.

When a sampling period is terminated, a collection period is initiated for summing the capacity calculated by the samples.

The sizes are normalized, so as to adjust to the real size of the logical and physical space. It is assumed that the total logical and physical size of the entire system is known. Therefore, the weight of the logical part of each sample is: the total logical size of the system divided by the number of samples that were taken during the sapling period. Therefore, if a certain file was sampled X times (i.e., X logical bytes are accounted to the file), then the estimated logical size of the file is: X*<total logical size>/<number of samples>. A similar calculation is applied to the physical calculation. The weight of the physical part of each sample is: the total physical size of the system divided by the number of samples that were taken during the sapling period. Therefore, if a counter of a certain file counts Y bytes (when taking the data reduction into account), then the estimated physical size of the file is:

Y*<total physical size>/<number of samples>.

The summing involves an upward climb of the filesystem tree that is executed iteratively, from the leaves that include counters of files, along the parent directory of each file, and any ancestors of the parent directory, until the root is reached, and the sizes of the logical and physical samples are added to the counters of ancestor directories encountered during the upward climb.

The upward climb for a sample is facilitated by using a pointer or an identifier of the upper parent directory, which is stored as part of metadata of each file and each directory.

For a sample of a snapshot that protect a certain sub-hierarchy, the historic parent directory, i.e., the directory that used to be the parent of the sampled snapshot, at the time of the snapshot, needs to be used. Since filesystem elements (files and directories) can be moved by a user from one directory to another, each filesystem element is associated with a list of historic parent directories and the time ranges when each parent directory hosted the filesystem entity. Thus, when climbing the tree for the upward path of a specific snapshot sample, the upper directory upon each iteration is selected according to the historic parent directory that corresponds to the time of the sampled snapshot.

The summing includes adding the sum to the historic statistics, using a moving average to aggregate the results across sampling periods. For example, the historic statistics may be assigned with as weight of 70% and the contribution of the current sampling period may be 30%.

The sampling is performed by multiple compute nodes of the storage system in parallel, where each compute node stores the counters in its cache, during the sampling period.

When a sampling period is terminated, the compute nodes are instructed by a sampling manager (which may be a module within one of the compute nodes) to start accumulating the counters. Each compute node then performs the upward climbing, starting from the leaves, to sum the counters in the ancestor directories, in the local copy of the counters in the cache.

All the compute nodes have access to a shared storage in one or more storage nodes, where the counters handled by all the compute nodes are aggregated.

Once a compute node has completed the accumulation of the counters for the ancestor directories, the compute node adds its counters to the equivalent shared counters in the shared storage.

FIG. 1 illustrates a method 100 for determining size information related one or more file systems stored in a storage system.

Method 100 may start by step 110 of sampling one or more logical spaces that are associated with the one or more file systems to provide sampled file system entities (FSEs); wherein a number of samples per sampled FSE is indicative of a size of the sampled FSEs. The sampling may be executed during a sampling period of any duration—for example minutes, hours, days and the like, and the number of samples may exceed 10, 100, 1,000, 10,000, 100,000, 1,000,000 and the like- and may provide a tradeoff between resource consumption and accuracy. The tradeoff may be fixed or may vary according to the amount to temporarily available resources (computational and/or storage), size of the one or more storage system, number of queries of clients regarding size of layers of a file system, and the like. The sampling may include selecting any offset within the one or more logical spaces, regardless of any specific FSE, and then obtaining an identity of the FSE that own the data in the selected offset. The FSE may be, for example, a file or a directory.

Step 110 may be followed by step 120 of determining logical sizes and physical sizes of different levels of the hierarchies of the one or more file systems based on the sampled file system entities.

Step 120 may include step 122 of calculating logical sizes of the sampled FSEs and calculating physical sizes of the sampled FSEs. The calculated size of each sampled FSE is based on the number of times the FSE was sampled, as reflected in the counter that accumulates the sizes of the samples of the FSE (logical/physical size value).

Step 122 may be based on a mapping between the different levels of the one or more file systems and the sampled FSEs. For example, each FSE may include a reference to an upper level parent of the FSE, that allows traversing the tree in the upward direction.

Step 122 may include upward traversing the one or more file systems while aggregating logical size and physical size information of parent directories of the sampled FSEs.

Step 122 may include multiple repetitions of (a) calculating a logical size of a sampled FSE; and (b) calculating the physical size of the sampled FSE based on the logical size of the sampled FSE.

A calculating of the physical size of a sampled FSE may also be based on a data reduction parameter related to a storage of the sampled FSE in the storage system.

The data reduction parameter may be a compression ratio, or a similarity data reduction parameter or a de-duplication parameter.

For example—assuming that the sampled FSE is referring to a reference stored element used for data reduction of a first number of referring stored elements, and wherein the data reduction parameter represents the first number. The deduplication parameter may be the number of referring stored elements.

Step 122 may also include normalizing the logical sizes and the physical sizes of the sampled FSEs. The normalizing of the logical sizes is responsive to an aggregate logical size of the one or more file systems and may be further responsive to the number of samples—for example—any logical size value may be multiplied by the aggregate logical size of the one or more file systems and divided by the number of samples that were taken during the sampling period.

Step 122 may include normalizing the physical sizes in response to an aggregate physical size of the one or more file systems and may be further responsive to the number of samples—for example—any physical size value may be multiplied by the aggregate physical size of the one or more file systems and divided by the number of samples that were taken during the sampling period.

Step 120 may be followed by step 130 of responding to the determining. The responding may include storing the logical sizes and physical sizes of different levels of the one or more file systems based on the sampled file system entities, sending to another computerized system (for example a client computer) information about the logical sizes and physical sizes of different levels of the one or more file systems based on the sampled file system entities, receiving a query related to a certain level of a certain file system and responding—using the information about the logical sizes and physical sizes of different levels of the one or more file systems based on the sampled file system entities, comparing a size of one or more level of a file system and performing a memory management operation such as compression, removal of entities, alerting a client, and the like.

FIG. 2 illustrates a mapping data structure 200 for mapping logical addresses of a filesystem entity such as a file, into physical locations where the data of the file is stored.

The file root 201 points to first level nodes 210(1)-210(n) that map first level address ranges. Each first level node may point to one or more second level nodes that map second level address ranges. For example—first level node 210(1) points to second level nodes 220(1) and 220(2), first level node 210(3) points to second level nodes 220(3), 220(4) and 220(5). There may be one or more levels of address ranges, wherein each level splits the ranges into smaller ranges.

The next level after the one or more levels of address ranges is a mapping level 240 that includes mapping blocks that cover the entire logical address space of the system. Multiple files may share this level, since more than one file can share the same content.

Figure 3:
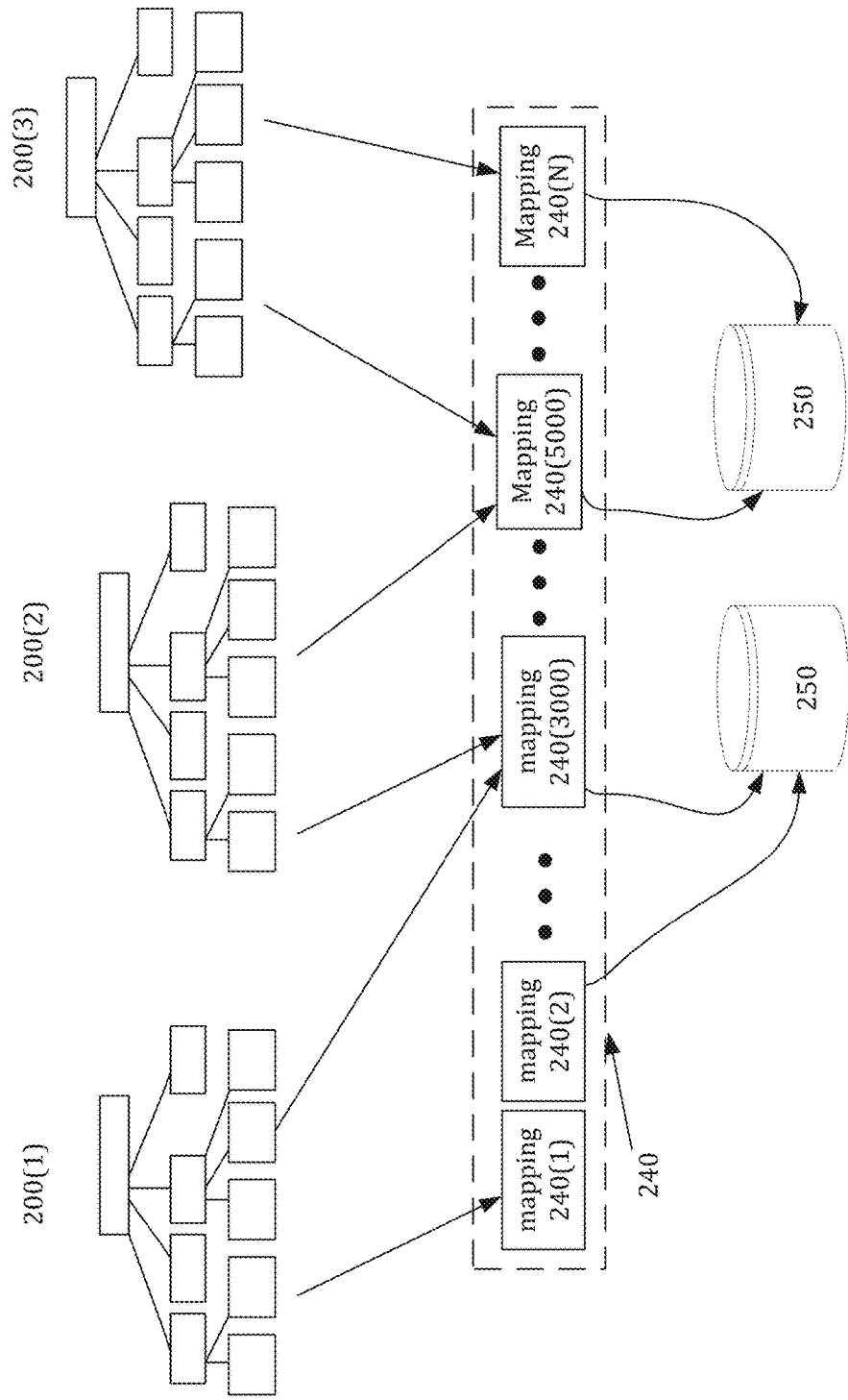
FIG. 3 is an example of data structures.

FIG. 3 illustrates an example of three mapping data structures 200(1)-200(3) of three different files that share mapping provided by mapping level 240.

Each block of mapping level 240 maps a content of a certain logical range into a physical location 250.

When selecting a random sample of a logical offset, the selecting may include selecting any of the mapping blocks 240(1)-240(N). This selecting may further include selecting any offset out of the range covered by the selected mapping block. The identity of the file may be obtained from the selected mapping block.

Figure 4:
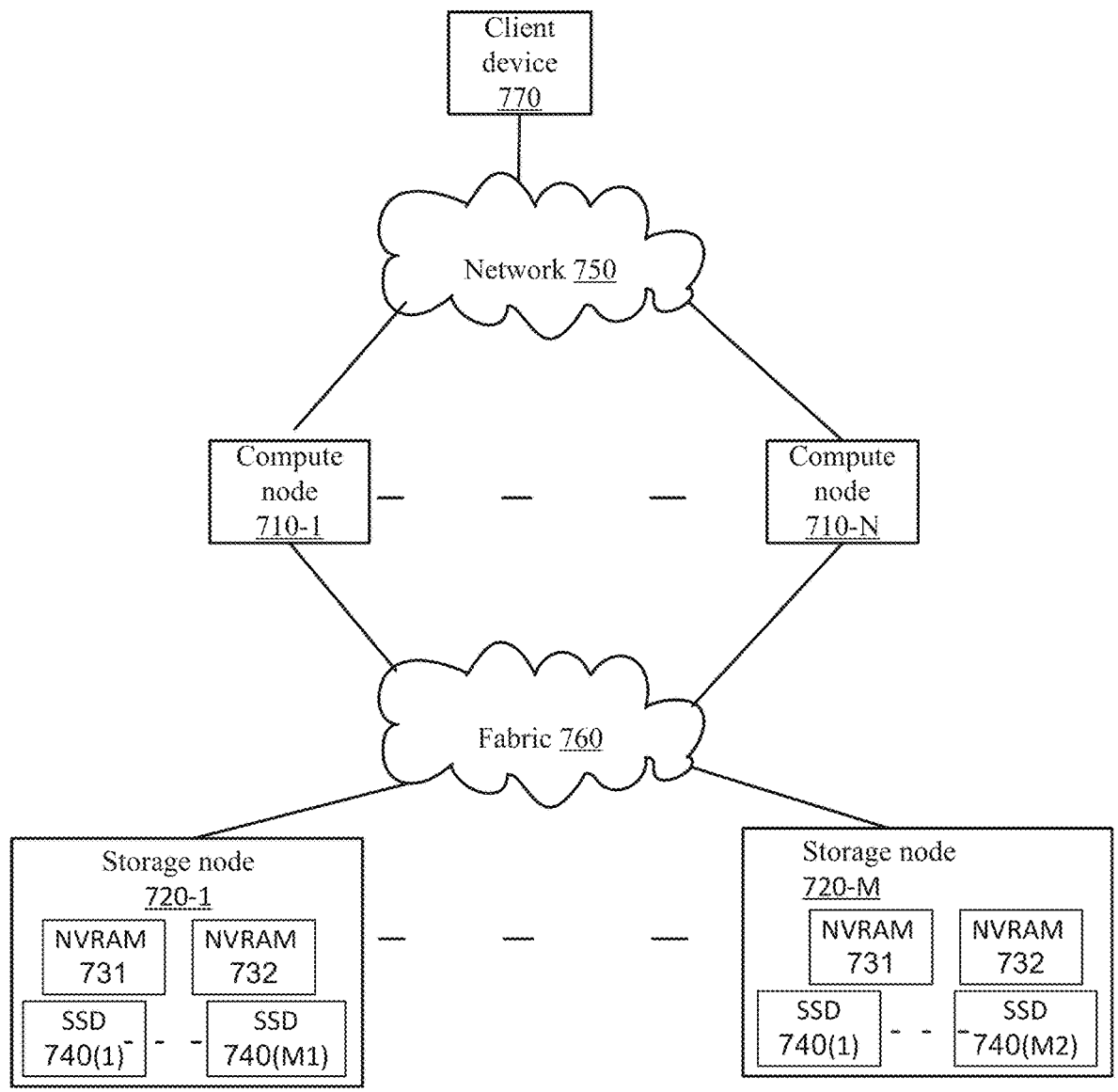
FIG. 4 is an example of a storage system.

FIG. 4 illustrates a storage system 700 that includes storage system compute elements such as multiple (N) compute nodes 710-1 to 710-N and storage resources such as multiple (M) storage nodes 720-1 to 720-M. The storage node may store the one or more file systems and at least one compute node may be configured to execute method 100. The execution of method 100 may be accelerated when it is executed in parallel by multiple compute nodes—for example the sampling may be executed in parallel. The aggregating may be done at least partially in parallel—and may use values stored in a shared memory accessible by multiple compute nodes.

The compute nodes communicate with the storage nodes via a network, such as fabric 760, and with one or more clients, such as client device 770, via network 750, and may receive size queries from client device 770 regarding logical and physical sizes of different directories, and send the size queries responses to client device 770. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The file systems and the filesystem entities are stored in various storage devices of the storage nodes. The size counters may be saved in the storage nodes, e.g., in NVRAM 731, and are accessible for updating or retrieving by any of the compute nodes. The storage system compute element may be a compute node or a compute entity (e.g., a processor) within the compute node.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for determining size information related one or more file systems stored in a storage system, the method comprises:
   sampling, in a random manner and during a sampling period, a logical address space, that is associated with the one or more file systems to provide sampled logical addresses;
   obtaining identities of sampled file system entities (FSEs) associated with the sampled logical addresses;
   estimating a size of each sampled FSE, based on a number of sampled logical addresses collected for the sampled FSE during the sampling period, a total size of the logical address space, and a number of samples obtained for the logical address space during the sampling period; and
   determining logical sizes and physical sizes of different levels of the one or more file systems based on the sampled file system entities.

2. The method according to claim 1 wherein the determining comprises calculating (a) logical sizes of the sampled FSEs and (b) physical sizes of the sampled FSEs.

3. The method according to claim 2 wherein the determining is based on the logical sizes and physical sizes of the sampled FSEs and on a mapping between the different levels of the one or more file systems and the sampled FSEs.

4. The method according to claim 2 wherein the determining comprises upward traversing the one or more file systems while aggregating logical size and physical size information of parent directories of the sampled FSEs.

5. The method according to claim 2 wherein a calculating of a logical size of a sampled FSE and a calculating of a physical size of the sampled FSE comprises:
   calculating a logical size of the sampled FSE; and
   calculating the physical size of the sampled FSE based on the logical size of the sampled FSE.

6. The method according to claim 5 wherein the calculating of the physical size of the sampled FSE is also based on a data reduction parameter related to a storage of the sampled FSE in the storage system.

7. The method according to claim 6 wherein the data reduction parameter is a compression ratio.

8. The method according to claim 6 wherein the data reduction parameter is a similarity data reduction parameter.

9. The method according to claim 8 wherein the sampled FSE is referring to a reference stored element used for data reduction of a first number of referring stored elements, and wherein the data reduction parameter represents the first number.

10. The method according to claim 6 wherein the data reduction parameter is a de-duplication parameter.

11. The method according to claim 2 wherein the determining comprises normalizing the logical sizes and the physical sizes of the sampled FSEs.

12. The method according to claim 11 wherein the normalizing of the logical sizes is responsive to an aggregate logical size of the one or more file systems.

13. The method according to claim 11 wherein the normalizing of the physical sizes is responsive to an aggregate physical size of the one or more file systems.

14. The method according to claim 1 comprising responding to the determining.

15. A non-transitory computer readable medium for determining size information related one or more file systems stored in a storage system, the non-transitory computer readable medium stores instructions for:
   sampling, in a random manner and during a sampling period, a logical address space that is associated with the one or more file systems to provide sampled logical addresses;
   obtaining identities of sampled file system entities (FSEs) associated with the sampled logical addresses;
   estimating a size of each sampled FSE, based on a number of sampled logical addresses collected for the sampled FSE during the sampling period, a total size of the logical address space, and a number of samples obtained for the logical address space during the sampling period; and
   determining logical sizes and physical sizes of different levels of the one or more file systems based on the sampled file system entities.

16. The non-transitory computer readable medium according to claim 15 wherein the determining comprises calculating (a) logical sizes of the sampled FSEs and (b) physical sizes of the sampled FSEs.

17. The non-transitory computer readable medium according to claim 16 wherein the determining is based on the logical sizes and physical sizes of the sampled FSEs and on a mapping between the different levels of the one or more file systems and the sampled FSEs.

18. The non-transitory computer readable medium according to claim 16 wherein the determining comprises upward traversing the one or more file systems while aggregating logical size and physical size information of parent directories of the sampled FSEs.

19. The non-transitory computer readable medium according to claim 16 wherein a calculating of a logical size of a sampled FSE and a calculating of a physical size of the sampled FSE comprises:
   calculating a logical size of the sampled FSE; and
   calculating the physical size of the sampled FSE based on the logical size of the sampled FSE.

20. The non-transitory computer readable medium according to claim 19 wherein the calculating of the physical size of the sampled FSE is also based on a data reduction parameter related to a storage of the sampled FSE in the storage system.

21. The non-transitory computer readable medium according to claim 20 wherein the data reduction parameter is a compression ratio.

22. The non-transitory computer readable medium according to claim 20 wherein the data reduction parameter is a similarity data reduction parameter.

23. The non-transitory computer readable medium according to claim 22 wherein the sampled FSE is referring to a reference stored element used for data reduction of a first number of referring stored elements, and wherein the data reduction parameter represents the first number.

24. The non-transitory computer readable medium according to claim 22 wherein the data reduction parameter is a de-duplication parameter.

25. The non-transitory computer readable medium according to claim 16 wherein the determining comprises normalizing the logical sizes and the physical sizes of the sampled FSEs.

26. The non-transitory computer readable medium according to claim 25 wherein the normalizing of the logical sizes is responsive to an aggregate logical size of the one or more file systems.

27. The non-transitory computer readable medium according to claim 25 wherein the normalizing of the physical sizes is responsive to an aggregate physical size of the one or more file systems.

28. The non-transitory computer readable medium according to claim 15 that stores instructions for responding to the determining.

29. A storage system that comprises storage resources and compute resources;
wherein one or more of the compute resources are configured to:
sample, in a random manner and during a sampling period, a logical address space that is associated with the one or more file systems to provide sampled logical addresses;
obtain identities of sampled file system entities (FSEs) associated with the sampled logical addresses;
estimate a size of each sampled FSE, based on a number of sampled logical addresses collected for the sampled FSE during the sampling period, a total size of the logical address space, and a number of samples obtained for the logical address space during the sampling period; and
determine logical sizes and physical sizes of different levels of the one or more file systems based on the sampled file system entities.

* * * * *